(12) United States Patent
Park (10) Patent No.: US 6,202,687 B1
(45) Date of Patent: Mar. 20, 2001

(54) MATRIX MULTIPLE VALVE SYSTEM

(75) Inventor: Han-Oh Park, Taejon (KR)

(73) Assignee: Bioneer Corporation, Choongcheonbuk-do (KR)

( * ) Notice: Subject to any disclaimer, the term of this patent is extended or adjusted under 35 U.S.C. 154(b) by 0 days.

(21) Appl. No.: 09/508,533

(22) PCT Filed: Oct. 19, 1998

(86) PCT No.: PCT/KR98/00319

§ 371 Date: Apr. 3, 2000

§ 102(e) Date: Apr. 3, 2000

(87) PCT Pub. No.: WO99/20387

PCT Pub. Date: Apr. 29, 1999

(30) Foreign Application Priority Data

Oct. 18, 1997 (KR) .................................................. 97-53556

(51) Int. Cl.[7] .................................................. F16K 11/02
(52) U.S. Cl. .......................................... 137/597; 137/637
(58) Field of Search .................................... 137/579, 637, 137/884

(56) References Cited

U.S. PATENT DOCUMENTS

| | | | | |
|---|---|---|---|---|
| 3,512,553 | * | 5/1970 | Legris | 137/597 |
| 3,744,376 | * | 7/1973 | Carpenter | 137/12 |
| 3,765,441 | * | 10/1973 | Chang | 137/271 |
| 3,881,513 | * | 5/1975 | Chang | 137/884 |

FOREIGN PATENT DOCUMENTS

| | | |
|---|---|---|
| 93/17785 | 9/1993 | (WO) . |
| 94/01215 | 1/1994 | (WO) . |
| 97/10896 | 3/1997 | (WO) . |

* cited by examiner

*Primary Examiner*—John Fox
(74) *Attorney, Agent, or Firm*—Jacobson, Price, Holman & Stern, PLLC (57) ABSTRACT

The system opens and closes an n×m array of liquid pathways using n+m valves. The pathways (2) run from top to bottom of a body (1). Control bars (4), also with liquid pathways (2), are inserted in channels (3). These are movable by a power source. The liquid pathways are opened to pass liquid when the pathways in the body and the control bars are aligned with each other.

14 Claims, 6 Drawing Sheets

MATRIX MULTIPLE VALVE SYSTEM

BACKGROUND OF THE INVENTION

1. Field of the Invention

The present invention relates to a matrix multiple valve system, more specifically, a matrix multiple valve system comprising a small number of operating valves which are positioned in an orthogonal manner, to control a large number of liquid pathways.

2. Description of the Prior Art

Recently, biotechnology has been regarded as a high value-added industry, accompanying the rapid development of genetic engineering. In line with the development, there is an increasing demand for automated apparatus which can be applied for the synthesis of desired oligomers such as oligonucleotides and oligopeptides. However, the conventional apparatus essentially requires tens to thousands of liquid pathways to synthesize tens to hundreds of oligomers and the same number of auxiliaries to control the said liquid pathways.

For example, to control each of (n×m) liquid pathways in the oligomer synthesis, the conventional synthesizers would require the same number of valves which are electronically operated, which, in turn, makes the apparatus become larger. Naturally, the conventional apparatus is proven to be less satisfactory in the sense that it is susceptible to errors in the intricate control of the liquid pathways and is too expensive to use in the various fields of biotechnology.

Under the circumstances, needs have continued to exist for the development of a matrix multiple valve system which can control tens to thousands of liquid pathways in a simple and precise manner.

SUMMARY OF THE INVENTION

In accordance with the present invention, a novel matrix multiple valve system which can control (n×m) array(n and m along X- and Y-axes, respectively) of liquid pathways using only (n+m) of operating valves is provided, which is fabricated based on the following principles:

First, along X- and Y-axes of a body, (n×m) array of liquid pathways running vertically from the top to the bottom of the body are provided, and (n+m) of control bars are inserted into channels such as holes for control bars or rooms between multi-assembled bodies, each of which are perpendicular to the liquid pathways, whereby the opening and the closing of the liquid pathways can be practiced by moving the control bars back and forth in a linear fashion through the channels.

Second, on the upper and the lower halves of various matrix-type bodies, (n×m) array of liquid pathways and (n+m) of air-channels which are connected to grooves linking two liquid pathways each other, whose one end is connected to an operating valves, are provided in a symmetrical manner, whereby the opening and closing of the liquid pathways can be practiced by controlling the operating valves modulating an air-pressure provided by the air channels.

A primary object of the invention is, therefore, to provide a matrix multiple valve system which can control a large number of liquid pathways using a small number of operating valves.

BRIEF DESCRIPTION OF THE DRAWINGS

The above object and features of the present invention will become apparent from the following descriptions given in conjunction with the accompanying drawings, in which.

DETAILED DESCRIPTION OF THE INVENTION

In accordance with the matrix multiple valve system of the present invention, opening and closing of (n×m) array(n and m along X- and Y-axes, respectively) of liquid pathways can be controlled through (n+m) of operating valves along the X- and Y-axes, which comprises:

a body in which (n×m) array of liquid pathways are positioned to run through the top and the bottom of the body;

means for controlling liquid pathways of the body;

channels in which the means for controlling liquid pathways of the body is positioned; and, a power source which is connected to the means for controlling liquid pathways of the body, whereby the liquid pathways are opened to pass liquid therethrough, in case the liquid pathways on the body and the channels are aligned with each other to reach 'AND' state logically.

In the matrix multiple valve system, the means for controlling liquid pathways of the body may be: (n+m) of control bars in which (n+m) of liquid pathways are positioned with the same interval and diameter as the corresponding liquid pathways of the body, being inserted into the channels of the sides along X- and Y-axes of the body; (n+m) of control bars in which (n+m) of liquid pathways positioned with the same interval and diameter as the corresponding liquid pathways of the bodies, being inserted into rooms between the bodies in a linked form; and, (n+m) of air-channels which are connected to grooves through pipe and provide an elastic thin-membrane with air-pressure to open and close the liquid pathways of the body. And, the power source includes air pressure, liquid pressure, electromagnetic force, etc.

As a preferred embodiment of the invention, a matrix multiple valve system is provided, which comprises: a body in which (n×m) array of liquid pathways are positioned to run through the top and the bottom of the body; (n+m) of control bars in which (n+m) of liquid pathways are positioned with the same interval and diameter as the corresponding liquid pathways of the body, being inserted into the channels on the sides of X- and Y-axes of the body; and, a power source which is connected to one end of each of the control bars. In the matrix multiple valve system, the channels may be holes for control bars which are provided on the side of the X- and Y-axes, and the control bars have various shapes including circular, triangular, rectangular, etc.

As the other preferred embodiment of the invention, a matrix multiple valve system is provided with variations in the channels into which the control bars are inserted, which comprises: bodies, each of which is assembled ply on ply and has (n×m) array of liquid pathways positioned to run through the top and the bottom of the body; (n+m) of control bars in which (n+m) of liquid pathways are positioned with the same interval and diameter as the corresponding liquid pathways of the bodies, being inserted into rooms between the bodies in a linked form to give plate control bar; and, a power source which is connected to one end of each of the control bars. In the matrix multiple valve system, the channels may be rooms which are formed between the multi-assembled bodies, and conduits may be provided on the upper part of multi-assembly of the bodies to pass liquid therethrough. The control bar of the embodiment has the various shapes including circular, triangular, rectangular, etc.

As another preferred embodiment, the present invention provides a matrix multiple valve system, which is characterized in that: the means for controlling liquid pathways of the body is (n+m) of air-channels which are connected to grooves linking two liquid pathways each other, whose one end is connected to an operating valves controlling the entry of air-pressure to open and close the liquid pathways of the body.

The matrix multiple valve system of the present invention is explained in more detail with references on the accompanying drawings, which should not be taken to limit the scope of the present invention.

Figure 1:
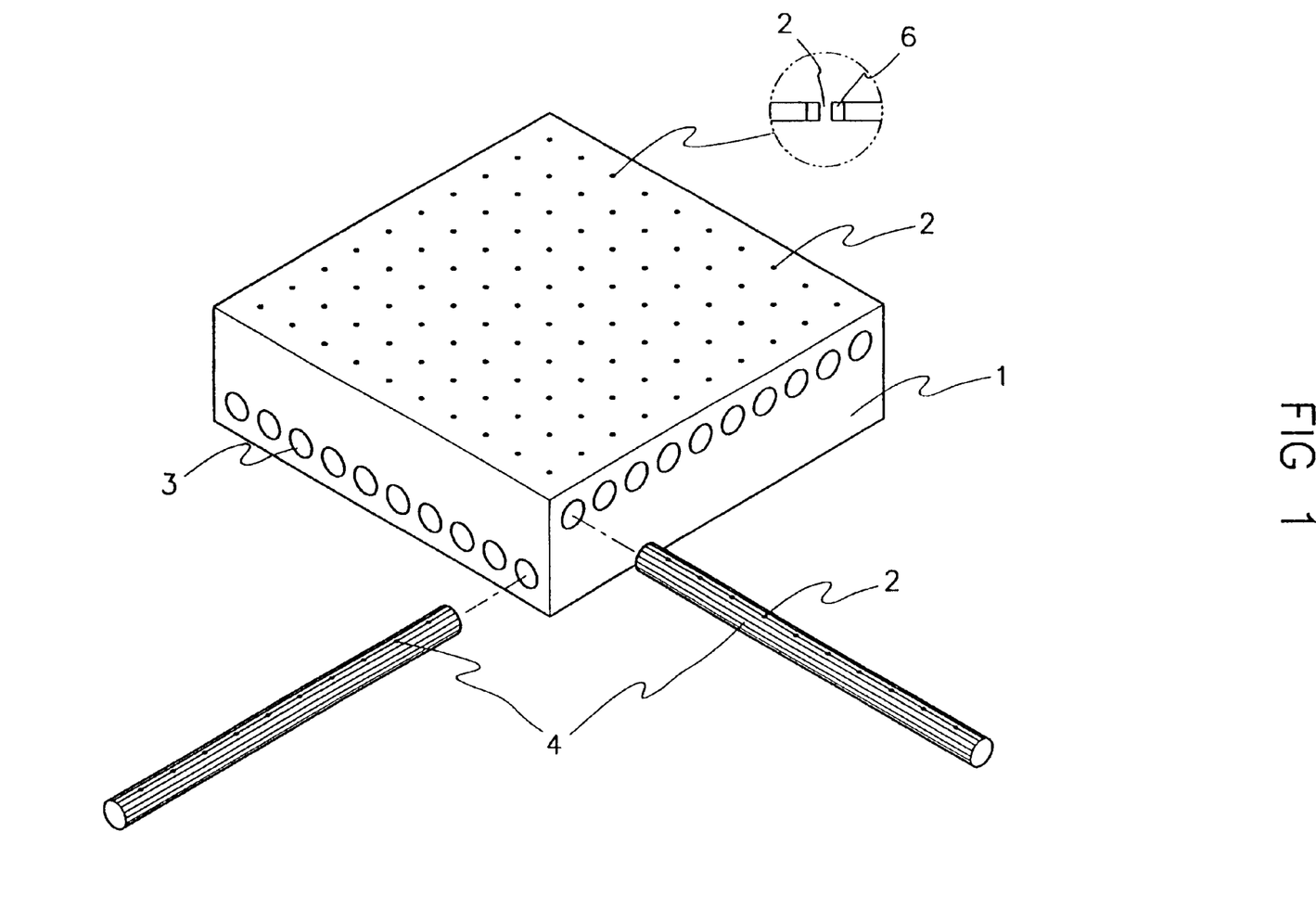
FIG. 1 is a perspective view of (10×10) orthogonal matrix multiple valve system, which is an embodiment of the present invention.

FIG. 1 is a perspective view of (10×10) orthogonal matrix multiple valve system, which is one of the preferred embodiments of the invention. Referring to FIG. 1, the matrix multiple valve system comprises a body in which (10×10) array of liquid pathways are positioned to run through the top and the bottom of the body; (10+10) of control bars in which (10×10) array of liquid pathways are positioned with the same interval and diameter as the corresponding liquid pathways of the body, being inserted into the sides along X- and Y-axes of the body; a power source which is connected to one end of each of the control bars; and, channels into which the control bars are inserted. In the body(1), there are provided 10 rows of liquid pathways(2) along the X-axis and 10 rows of liquid pathways(2) along the Y-axis to run through the top and the bottom of the body, and packings(6) to prevent the leakage of the liquid are equipped around the liquid pathways (see: partial enlarged view). In the matrix multiple valve system, the control bars(4) may be of various shapes such as circular, triangular, rectangular, etc, though it is preferable to have small diameter so as to minimize the friction applied to each control bar, the leakage of liquid and the amount of liquid left in the liquid pathway. And, perpendicular to the liquid pathways(2), 10 holes(3) exist as the channels for the control bars(4) on both sides of the X- and Y-axes of the body(1). The holes(3) are provided on both sides of the X- and Y-axes in a perpendicular position. Meanwhile, the power source for the control bars may be air pressure, liquid pressure, electromagnetic force, etc, though the air pressure or liquid pressure which provides stronger driving force is more preferable, to control the opening and closing of the liquid pathways in an accurate and rapid manner.

Figure 2A:
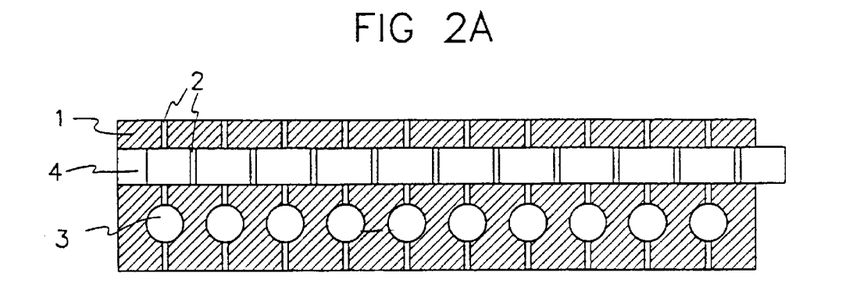
FIG. 2A is an X-axis sectional view of the (10×10) orthogonal matrix multiple valve system in a closed state.
Figure 2B:
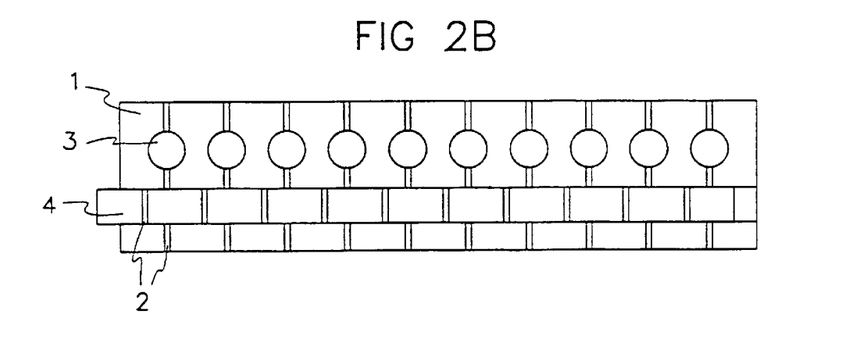
FIG. 2B is a Y-axis sectional view of the (10×10) orthogonal matrix multiple valve system in a closed state.
Figure 2C:
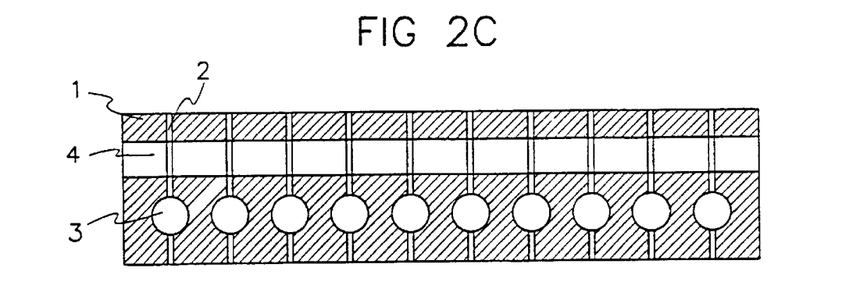
FIG. 2C is an X-axis sectional view of the (10×10) orthogonal matrix multiple valve system in an open state.
Figure 2D:
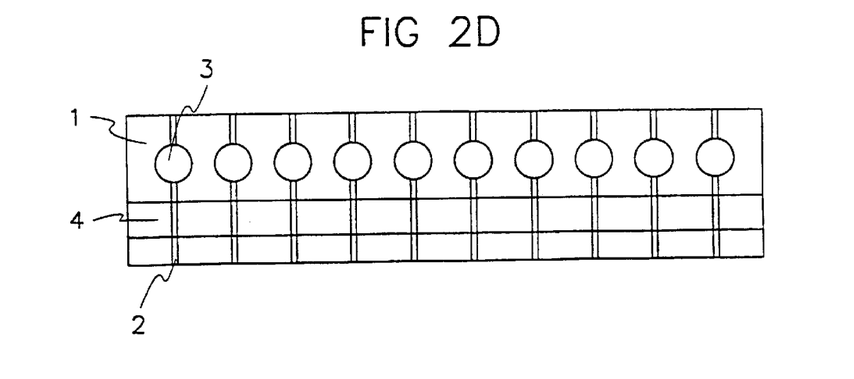
FIG. 2D is an Y-axis sectional view of the (10×10) orthogonal matrix multiple valve system in an open state.

FIGS. 2A, 2B, 2C, and 2D are X- and Y-axes section views of the (10×10) orthogonal matrix multiple valve system of FIG. 1. FIGS. 2A and 2B show the matrix multiple valve system in a closed state, where the liquid pathways(2) running through the top and bottom of the body(1) are not aligned with the liquid pathways(2) on the control bars(4) positioned in the holes(3). FIGS. 2C and 2D show the matrix multiple valve system in an open state, where the liquid pathways(2) running through the top and bottom of the body(1) and the liquid pathways(2) on the control bar(4) positioned in the holes(3) are all in alignment with each other.

Figure 3:
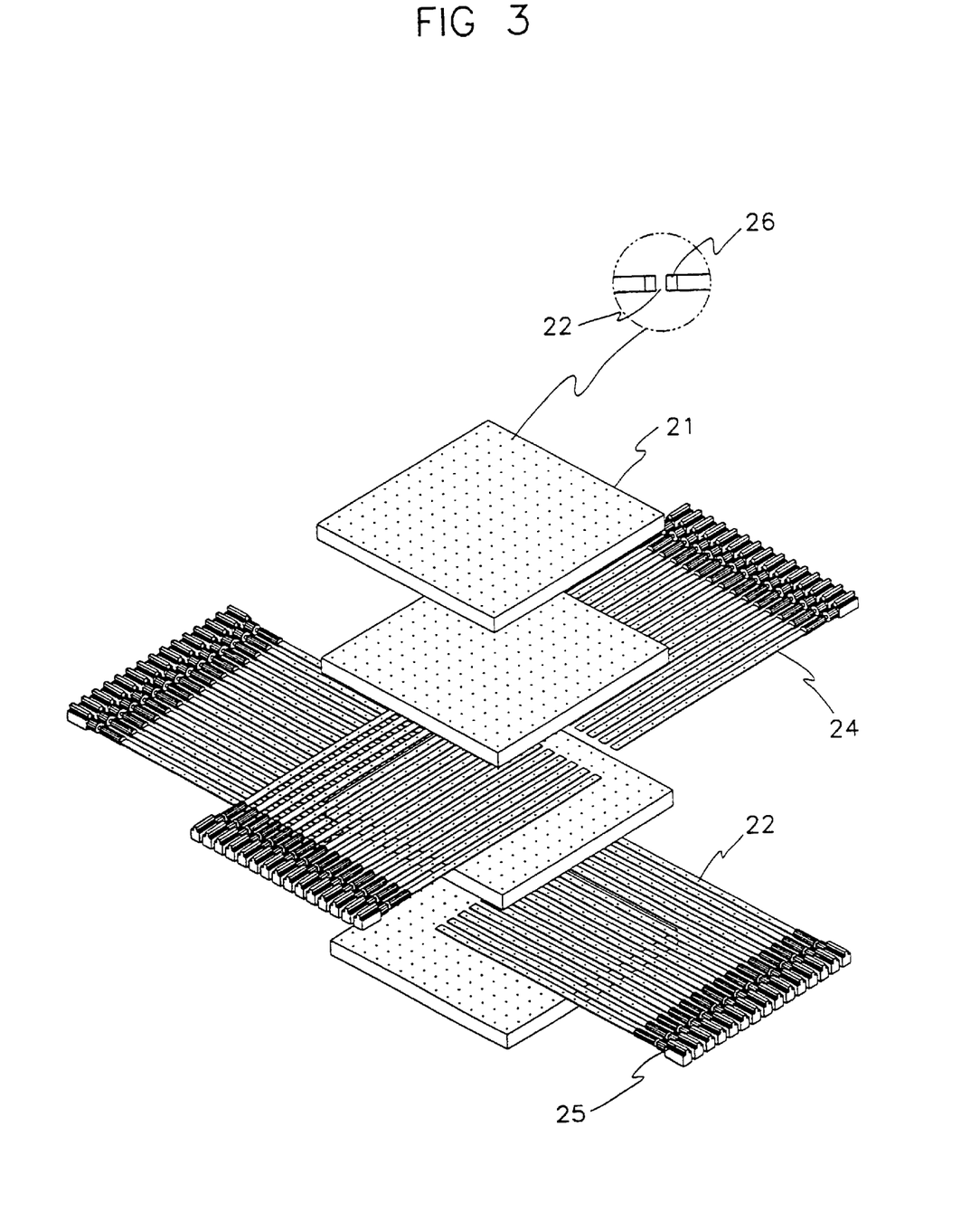
FIG. 3 is a perspective view of (16×16) orthogonal matrix multiple valve system in a multi-assembled structure, which is the other embodiment of the invention.

FIG. 3 is a perspective view of (16×16) orthogonal matrix multiple valve system in a multi-assembled structure, which is the other preferred embodiment of the invention. Unlike the (10×10) matrix multiple valve system of FIG. 1, there is provided a multi-assembly of 4 pieces of bodies(21), where (16×16) array of the liquid pathways(22) are positioned to run through the top and the bottom of the bodies(21) and packings(26) to prevent the leakage of the liquid are equipped around the liquid pathways of the upper body(see: partial enlarged view). And, the (16×16) orthogonal matrix multiple valve system may further comprises conduits(not shown) to transfer liquid through the liquid pathways(22), which are connected to the upper part of the bodies. Referring to FIG. 3, one upper body remained is equipped with packings(26) to connect the upper body with the conduits (not shown), and three lower bodies are assembled ply on ply to give rooms for each 8 control bars(24) along the 4 sides of the body as a channel. The rooms provide channels for a total of 32 control bars, where each of the 8 control bars(24) is linked with each other to form a 'plate-control' bar. To each of the plate-control bars is preferably connected a double-acting air-pressure cylinder(25) to control its positioning.

Figure 4A:
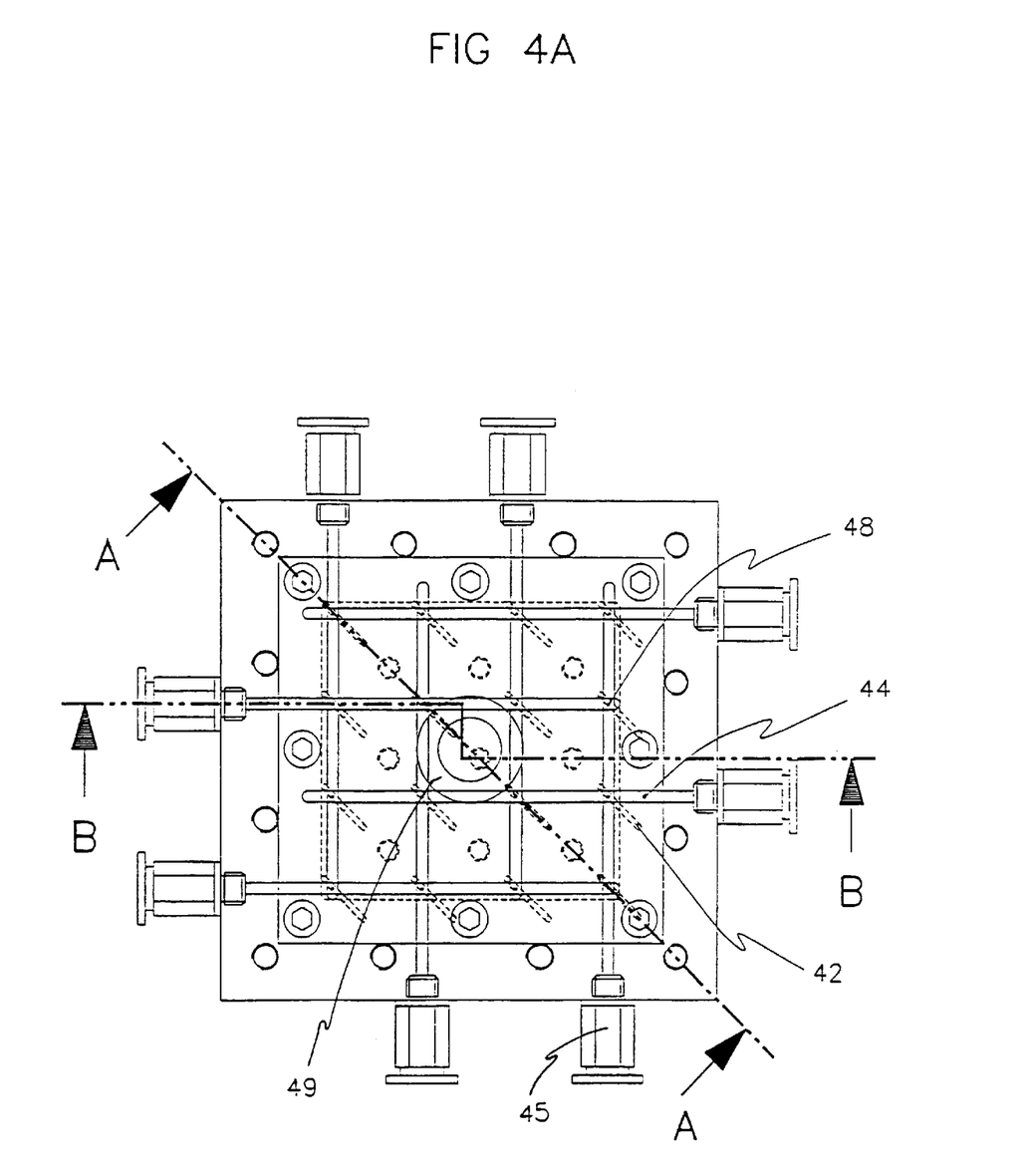
FIG. 4A is a top plan view of (4×4) orthogonal matrix multiple valve system, which is another embodiment of the invention.
Figure 4B:
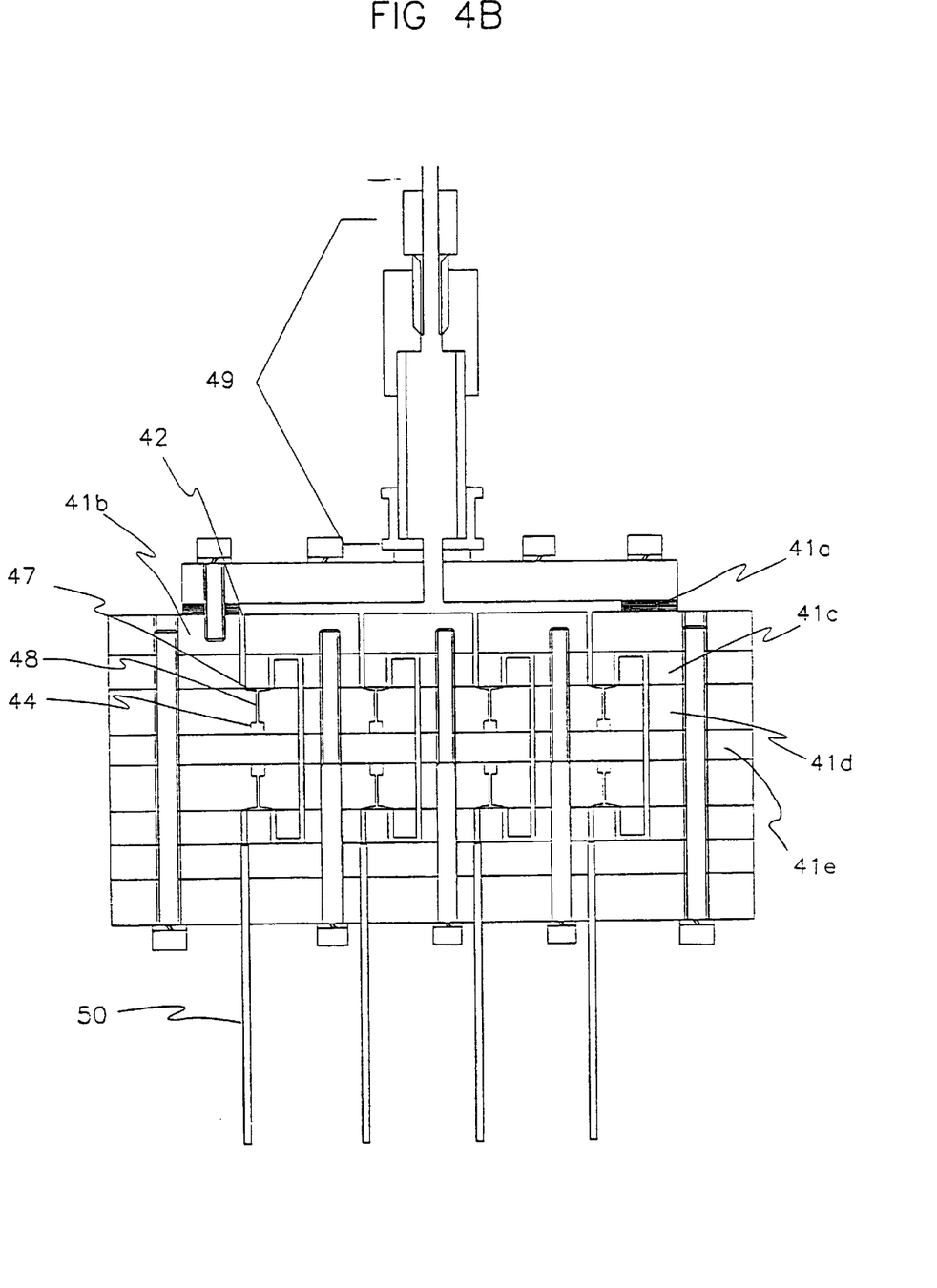
FIG. 4B is an A—A axis sectional view of the (4×4) orthogonal matrix multiple valve system of FIG. 4A.
Figure 4C:
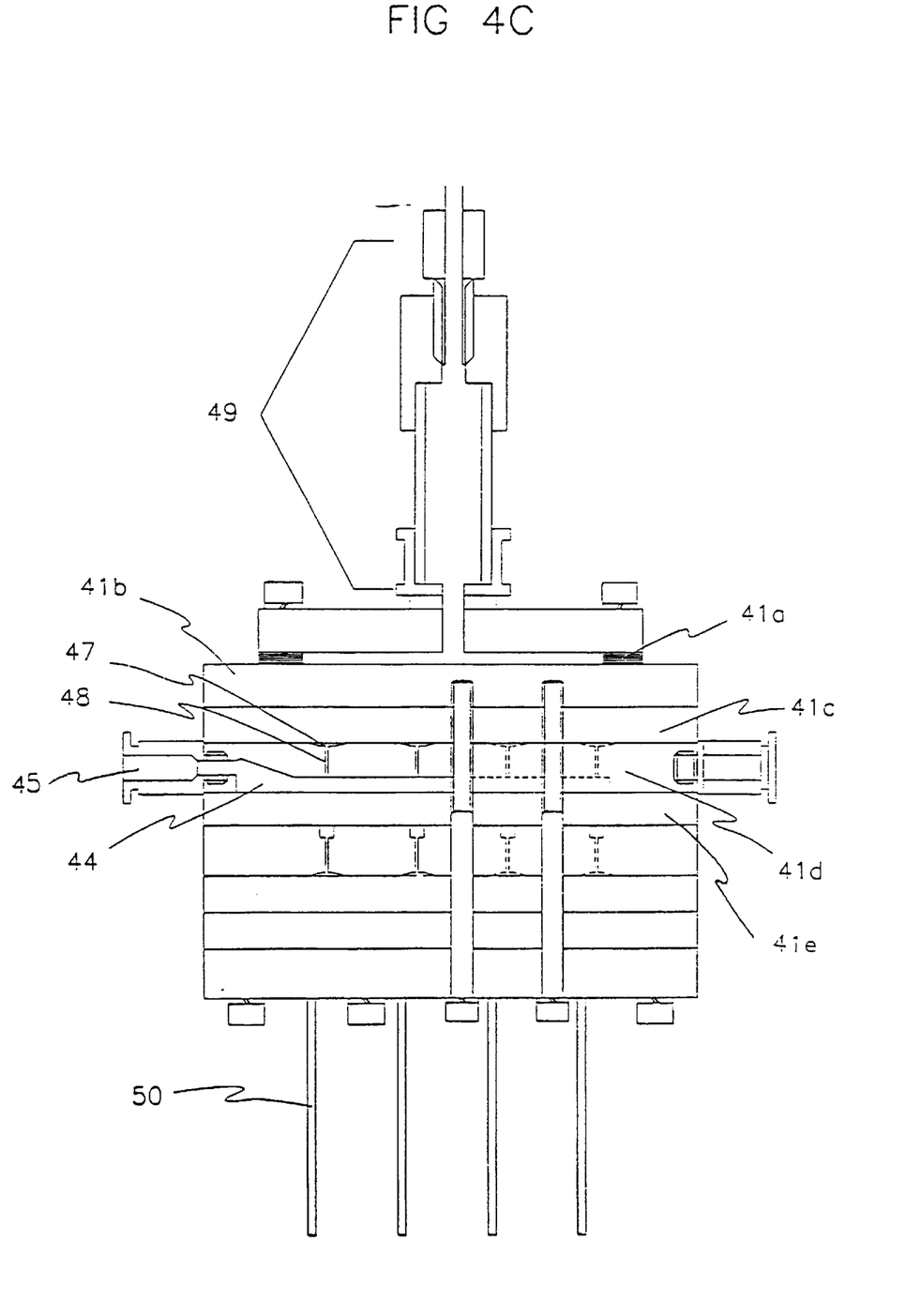
FIG. 4C is a B—B axis sectional view of the (4×4) orthogonal matrix multiple valve system of FIG. 4A.

FIGS. 4A, 4B and 4C show a top plan view, an A—A and B—B axes sectional views of (4×4) orthogonal matrix multiple valve system, which is another preferred embodiment of the invention. As shown in FIGS. 4A to 4C, the (4×4) orthogonal matrix multiple valve system is fabricated by a combination of the upper and the lower halves, each of which comprises four matrix-type bodies, i.e., the first (41a), the second(41b), the third(41c) and the fourth(41d) bodies, which are aligned in a symmetrical position on the basis of a central body(41e). Each of the bodies has its characteristic (4×4) array of liquid pathways along the X- and Y-axes, except for the first body(41a) whose center part is virtually eliminated to remain its boundary part so that the liquid can pass through several liquid pathways in the second body (41b) simultaneously. In the third body(41c), there are provided U-curves each of which is formed by 3 liquid pathways in a plane, where two of the liquid pathway are linked by a groove(47) covered with an elastic thin-membrane(not shown) that can control the flow of liquid. In the fourth body(41d), (2+2) of air channels(44) are provided on one surface of the body in an reciprocal and intersecting manner, and on the other surface, the grooves(47) covered with an elastic thin-membrane(not shown) are provided, which eventually connects two neighboring liquid pathways in the third body(41c). Between the groove(47) and the air channel(44) is provided a small pipe(48) with a 0.5 mm diameter, and its surface is also covered with an elastic thin-membrane(not shown). At the end of each air channel (44), an operating valve(45), preferably, solenoid valve, which controls the entry of air through the air channel(44) is connected, and the elastic thin-membrane covering the grooves(47) makes it possible the opening and closing of the liquid pathways by using an air-pressure out of the air channel(44).

On the lower half of the bodies, the same structures as explained in the above are provided in the opposite direction on the basis of the central body(41e) so that the two structures of bodies except for the first one (41a), liquid pathways(42), grooves(47), pipes(48), air channels(44) and operating valves(45) on the upper and the lower bodies are aligned in a symmetrical manner. In the center of the upper part of the bodies, a liquid-infusion equipment(49) to pass desired liquid into the bodies may be provided in a separate or combined manner, and at the ends of the liquid pathways, long tubes(50) may be connected to exit liquid.

In the matrix multiple valve system explained as above, the liquid pathways are opened to pass liquid therethrough, in case the liquid pathways on the bodies are aligned with one another to reach 'AND' state logically, that is, the liquid pathways on the upper and the lower halves of the bodies are opened simultaneously by applying the air-pressure provided by the air channels connected to grooves linking two neighboring liquid pathways.

The mode of action and effects of the matrix multiple valve system of the present invention is described in more detail with references on the accompanying drawings.

Opening and closing of all of liquid pathways in the matrix multiple valve system are controlled in a serial manner, as follows:

First, n number of control bars(4, 24) along the X-axis side of a body are put in a closed position, while turning m number of control bars(4, 24) along the Y-axis side to put in an open position by aligning with the liquid pathways of the body. Next, the control bars(4, 24) corresponding to the first row of liquid pathway along the X-axis is turned to put in an open position. And then, after letting some liquid pass through, the liquid pathways(2, 22) are closed by putting the said control bar back in a closed state. Likewise, by controlling each control bars(4, 24) along the X- and Y-axes, the desired liquid pathways(2, 22) can be opened or closed to pass liquid therethrough. Meanwhile, the opening or closing of only one liquid pathway out of the (n×m) liquid pathways can be achieved by putting the appropriate row and column of the control bars in an open state, regardless of the order of the procedure.

In the matrix multiple valve system shown in FIGS. 4A to 4C, if liquid is injected out of the liquid infusion equipment (49), liquid flows into the liquid pathways(42). Since the liquid pathways(42) are shaped as U-curve, the pressure must be applied so that the liquid can continuously flow into the liquid pathways(42). The closing of the liquid pathway (42) is achieved by applying air pressure through the air channels(44) on the upper or the lower half of the bodies: that is, if the air pressure through the air channels(44) is higher than that of the liquid in the liquid pathway(42), the air will travel into grooves(47) through pipe(48), which, in turn, pushes elastic thin-membrane(not shown) covering the grooves(47) to close the liquid pathways(42) which are connected with the grooves(47) horizontally. The air pressure through the air channel(44) can be controlled by the operating valve. In the closed state, all air channels(44) are under a given level of air pressure, and thus all liquid pathways(42) are closed off. Then the desired liquid pathway(42) can be opened by controlling the air pressure using the air channel along the appropriate X- and Y-axes. In the preferred embodiment, stainless steel or Teflon conferring the tightness when joint the bodies with the screw, may be used as a material for bodies.

As clearly explained as above, the present invention provides a matrix multiple valve system in which opening and closing of (n×m) array of liquid pathways can be controlled through (n+m) of operating valves along the X- and Y-axes. In accordance with the matrix multiple valve system of the invention, the desired amount of liquid can be dispensed through the desired liquid pathway. Furthermore, many different solutions can be dispensed in a desired amount, by modifying the matrix multiple valve system. Accordingly, the present invention can be practically applied in the chemical synthesis of various compounds.

While the present invention has been shown and describe with reference to the particular embodiments, it will be apparent to those skilled in the art that many changes and modifications in size, shape and materials, as well as in the details of illustrated structural integration, may be made without departing from the spirit and scope of the invention as defined in the claims. Particularly, any apparatus or method in which, by aligning (n×m) array of liquid pathways on a body with the liquid pathways on the moving control bars, or controlling air pressure using the operating valve to connect the liquid pathways on the matrix-type body throughout the various modifications of the present invention, (n×m) of liquid pathways can be controlled using only (n+m) of operating valves in the manner that the liquid pathways are opened to pass liquid therethrough, in case the liquid pathways on the body and the channels are aligned with each other to reach 'AND' state logically, should be included in the scope of the present invention.

What is claimed is:

1. A matrix multiple valve system in which opening and closing of (n×m) array, n and m along X- and Y-axes, respectively, of liquid pathways can be controlled through (n+m) of operating valves-along the X- and Y-axes, which comprises:

a body in which (n×m) array of liquid pathways are positioned to run through the top and the bottom of the body;

means for controlling liquid pathways of the body;

channels in which the means for controlling liquid pathways of the body is positioned; and, a power source which is connected to the means for controlling liquid pathways of the body, whereby the liquid pathways are opened to pass liquid therethrough, in case the liquid pathways on the body and the channels are aligned with each other to reach 'AND' state logically.

2. The matrix multiple valve system of claim 1, wherein the means for controlling liquid pathways of the body is (n+m) of control bars in which (n+m) of liquid pathways are positioned with the same interval and diameter as the corresponding liquid pathways of the body, being inserted into the channels on the sides of X- and Y-axes of the body.

3. The matrix multiple valve system of claim 2, wherein the channels are holes which are provided on the sides of X- and Y-axes of the body in a perpendicular position to the liquid pathways.

4. The matrix multiple valve system of claim 1, wherein the body is multiple-assembled ply on ply and has (n×m) array of liquid pathways positioned to run through the top and the bottom of the bodies, and the means for controlling liquid pathways of the bodies is (n+m) of control bars in which (n+m) of liquid pathways positioned with the same interval and diameter as the corresponding liquid pathways of the bodies, being inserted into the channels in a linked form.

5. The matrix multiple valve system of claim 4, wherein the channels are rooms between the multi-assembled bodies.

6. The matrix multiple valve system of claim 4, which further comprises conduits provided on the upper part of the multi-assembled bodies to pass liquid therethrough.

7. The matrix multiple valve system of claim 2, which further comprises a packing equipped around the liquid pathways to prevent the leakage of the liquid.

8. The matrix multiple valve system of claim 2, wherein the shape of the control bar is circular, triangular, or rectangular.

9. The matrix multiple valve system of claim 1, wherein the body is multiple-assembled ply on ply and has (n×m) array of liquid pathways positioned to run through the top and the bottom of the bodies, and the means for controlling liquid pathways of the bodies is (n+m) of air-channels which are connected to grooves linking two neighboring liquid pathways each other, whose one end is connected to an operating valve controlling the entry of air-pressure to open and close the liquid pathways of the bodies.

10. The matrix multiple valve system of claim 9, wherein two sets of the multi-assembled bodies are combined in a symmetrical manner on the basis of a central body.

11. The matrix multiple valve system of claim 9, wherein the operating valve is a solenoid valve.

12. The matrix multiple valve system of claim 9, which further comprises a liquid-infusion equipment provided in the center of the upper part of the bodies in a separate or combined manner.

13. The matrix multiple valve system of claim 9, which further comprises tubes for the exit of liquid, being connected to the end of the liquid pathways.

14. The matrix multiple valve system of claim 1, wherein the power source is air pressure, liquid pressure, or electromagnetic force.

* * * * *